United States Patent
Franchet et al.

(10) Patent No.: US 6,688,552 B2
(45) Date of Patent: Feb. 10, 2004

(54) VARIABLE CYCLE PROPULSION SYSTEM WITH MECHANICAL TRANSMISSION FOR A SUPERSONIC AIRPLANE

(75) Inventors: Michel Franchet, Pouilly-le-Fort (FR); Yann Laugier, Noiseau (FR); Jean Loisy, Ponthierry (FR)

(73) Assignee: Snecma Moteurs, Paris (FR)

( * ) Notice: Subject to any disclaimer, the term of this patent is extended or adjusted under 35 U.S.C. 154(b) by 0 days.

(21) Appl. No.: 10/170,381

(22) Filed: Jun. 14, 2002

(65) Prior Publication Data

US 2002/0190158 A1 Dec. 19, 2002

(30) Foreign Application Priority Data

Jun. 14, 2001 (FR) ............................................. 01 07775

(51) Int. Cl.[7] ................................................ B64C 15/02
(52) U.S. Cl. ........................ 244/12.3; 244/55; 244/58; 244/62
(58) Field of Search ........................ 244/12.3, 13, 55, 244/58, 60, 62

(56) References Cited

U.S. PATENT DOCUMENTS

| 2,696,079 | A |   | 12/1954 | Kappus ..................... 60/35.54 |
| 3,485,462 | A | * | 12/1969 | Spence ......................... 244/55 |
| 4,033,119 | A |   | 7/1977  | Nichols ..................... 60/226 R |
| 4,222,235 | A |   | 9/1980  | Adamson et al. ......... 60/226 R |
| 5,274,999 | A |   | 1/1994  | Rohra et al. .................. 6/226.1 |
| 5,529,263 | A | * | 6/1996  | Rudolph ....................... 244/55 |
| 6,247,668 | B1| * | 6/2001  | Reysa et al. .................. 244/58 |

OTHER PUBLICATIONS

"Supersonic Boom The New Century Will See the First Flight of a Supersonic STOVL Fighter, The JFS–But History is Littered with Other, Failed Efforts" Flight International, Reed Business Information, Haywards Health, GB vol. 157, No. 4709, Jan. 1, 2000, pp. 82–83, 85, XP000887966.

* cited by examiner

Primary Examiner—J. Woodrow Eldred
(74) Attorney, Agent, or Firm—Oblon, Spivak, McClelland, Maier & Neustadt, P.C.

(57) ABSTRACT

A variable cycle propulsion system for a supersonic airplane comprises at least one engine capable of generating thrust for flight at supersonic speeds together with at least one auxiliary propulsion assembly that is separate from the engine and that is capable of generating additional thrust for takeoff, landing, and flight at subsonic speeds. The auxiliary propulsion assembly does not have a gas generator and means are provided for transmitting a fraction of the mechanical power produced by the engine to the auxiliary propulsion assembly in order to enable it to generate the additional thrust for takeoff, landing, and subsonic cruising flight. Means are provided for decoupling the mechanical transmission means for supersonic cruising flight.

6 Claims, 2 Drawing Sheets

VARIABLE CYCLE PROPULSION SYSTEM WITH MECHANICAL TRANSMISSION FOR A SUPERSONIC AIRPLANE

BACKGROUND OF THE INVENTION

The present invention relates to a variable cycle propulsion system for a supersonic airplane making it possible firstly to obtain high thrust with a high bypass ratio during takeoff, landing, and subsonic cruising flight in order to greatly reduce noise during those stages of flight and to improve specific fuel consumption, and secondly to obtain a high exhaust speed adapted to supersonic cruising flight.

More particularly, the invention relates to a propulsion system that has two different configurations: one configuration for takeoff, landing, and subsonic cruising flight; and another configuration for supersonic cruising flight.

When designing a supersonic commercial airplane, there arises the particular problem of low airplane engine noise during takeoff, climbing, and landing. In order to be certified, all airplanes must nowadays comply with low noise regulations for takeoff and landing.

Furthermore, supersonic airplane engines must also satisfy requirements of low engine pod drag during supersonic cruising, low specific fuel consumption while overflying inhabited areas at subsonic cruising speed, and reduced emissions of nitrogen oxide pollution close to the ozone layer at high altitude.

In order to satisfy these various requirements, engine manufacturers have proposed a variable cycle engine for propelling supersonic airplanes. Typically, that type of engine comprises a gas generator and at least one fan, the fan enabling the bypass ratio of the engine to be adjusted and thus enabling noise to be reduced. The engine adopts two different configurations: a configuration for subsonic cruising flight, takeoff, and landing using high bypass ratio; and another configuration for supersonic cruising flight with a low bypass ratio since there exists a degree of incompatibility between those two stages of flight in terms of engine operation.

The requirement for low engine noise during takeoff and landing implies in particular a low gas exhaust speed during takeoff and at subsonic cruising speed, and that is in contradiction with supersonic cruising flight which requires gas to be exhausted at high speed.

Noise level depends on gas exhaust speed, and to reduce noise to an acceptable level, exhaust speed must nowadays be less than 400 meters per second (m/s), which corresponds to a threshold of 103 decibels (dB) (with new regulations reducing this to 300 m/s or 90 dB as from the year 2006). Such an exhaust speed thus implies an engine having low specific thrust, which corresponds to a large bypass ratio, i.e. to a high level of drag when cruising at supersonic speed.

Thus, the variable cycle engines proposed by manufacturers seek to combine low engine noise during takeoff and landing, low specific fuel consumption during subsonic cruising, and high specific thrust during high altitude supersonic cruising.

Various variable cycle engine designs are known, however varying the bypass ratio of such designs does not enable optimization to be good, both in the subsonic configuration and in the supersonic configuration.

Adopting a gas exhaust speed that is equal to or less than 400 m/s requires an engine pod to be of large diameter, and all presently-known variable cycle engines, and in particular, when the fan is connected to and integrated in the engine, those described in French patents Nos. 2 513 697, 2 688 271, and 2 685 385 require the pod to present a front section that is larger than that which is optimum for supersonic cruising flight.

For example, U.S. Pat. No. 5,529,263 discloses a supersonic airplane having a propulsion assembly for takeoff, landing, and subsonic cruising flight, and two engines adapted for supersonic cruising flight. The propulsion assembly is constituted by retractable high-bypass ratio booster turbojets, and that presents numerous drawbacks, in particular concerning bulk and weight for the airplane.

OBJECT AND SUMMARY OF THE INVENTION

The present invention thus seeks to mitigate such drawbacks by proposing a variable cycle propulsion system for supersonic airplanes which clearly separates the subsonic and supersonic configurations, in particular by using one or more separate auxiliary fans of large diameter.

To this end, the invention provides a variable cycle propulsion system for a supersonic airplane, the system comprising at least one engine capable of generating thrust for supersonic flight speeds, and at least one auxiliary propulsion assembly separate from said engine and capable of generating additional thrust for takeoff, landing, and subsonic flight speeds, wherein the auxiliary propulsion assembly does not have a gas generator, and wherein transmission means are provided for transmitting a fraction of the mechanical power produced by said engine to said auxiliary propulsion assembly to enable it to generate additional thrust for takeoff, landing, and subsonic cruising flight, and means are provided for decoupling the transmission means for supersonic cruising flight.

Thus, during takeoff, landing, and subsonic cruising flight, the auxiliary propulsion assembly makes use of engine resources (mechanical energy production).

The auxiliary propulsion assembly has at least one fan dimensioned to produce the desired thrust with the required bypass ratio. The mechanical power can be taken from a turbine shaft, e.g. the low-pressure turbine shaft of the engine(s) and transmitted to the fan shaft by a mechanical transmission. A clutch-type coupling device is interposed in the mechanical transmission in order to enable mechanical power to be taken off for the auxiliary propulsion assembly in selective manner.

BRIEF DESCRIPTION OF THE DRAWINGS

Other characteristics and advantages of the present invention appear from the following description given with reference to the accompanying drawings that are not limiting in any way. In the figures.

DETAILED DESCRIPTION OF EMBODIMENTS

Figure 1:
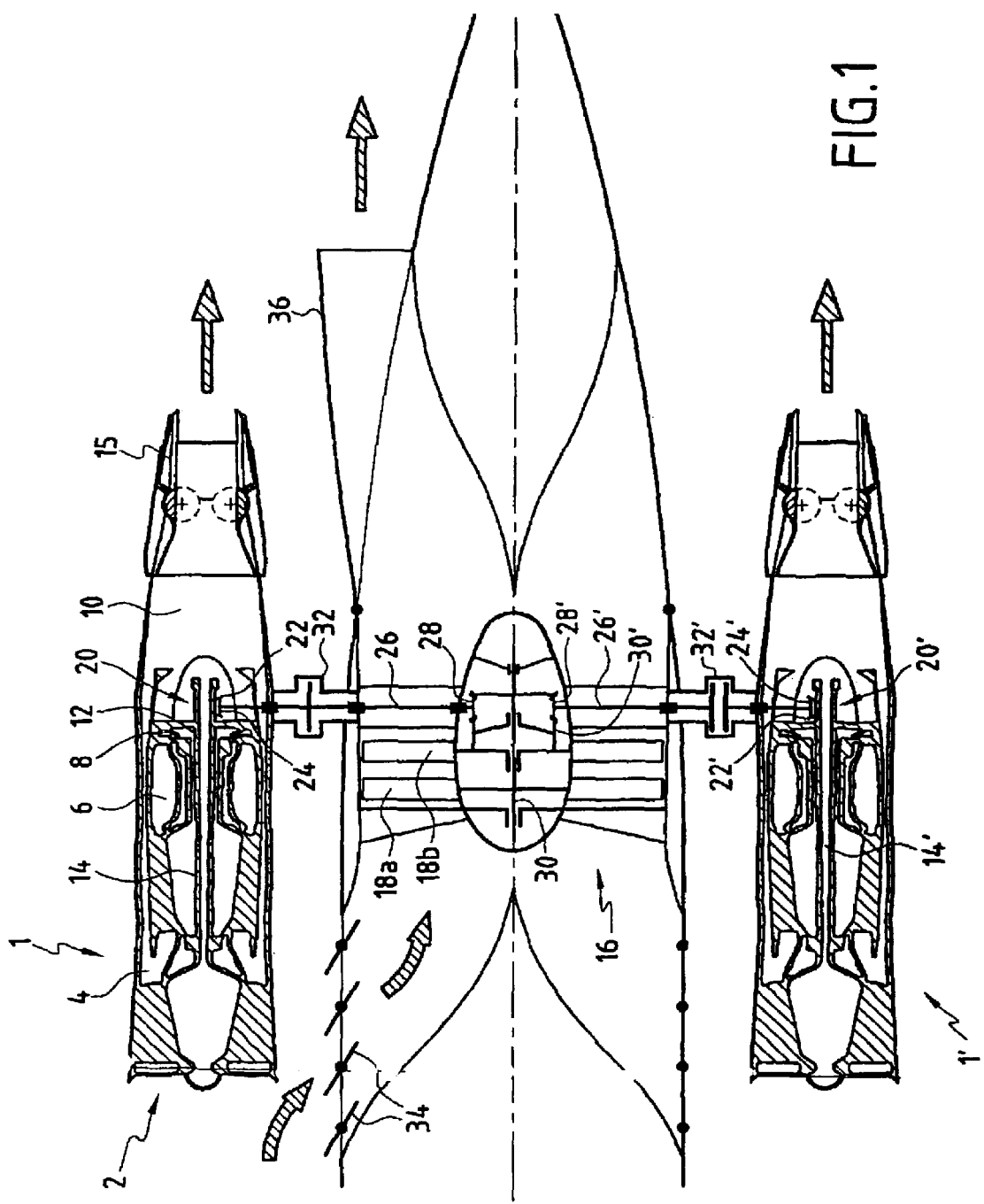
FIG. 1 is a diagrammatic fragmentary view of an airplane including a propulsion system constituting a first embodiment of the invention, shown in its configuration for takeoff, landing, and subsonic cruising flight and also in its configuration for supersonic cruising flight.

FIG. 1 is a diagrammatic longitudinal section view of a system constituting a first embodiment of the invention, in which it can be seen that it is constituted in particular by two engines 1 and 1'. These engines are conventionally placed in pods (not shown) which are generally connected to the bottom faces of respective airplane wings.

In conventional manner, the engines can be of the single-flow type, having one, two, or three shafts, or of the double-flow type, having one, two, or three shafts. In this embodiment, each engine comprises an air intake 2, a compressor section 4, a combustion chamber 6, a high-pressure turbine 8, a section 10 for exhausting combustion gas, and a low-pressure turbine 12 which rotates a low-pressure shaft 14. Furthermore, the engines are dimensioned so as to be optimized for supersonic cruising flight (the period involving the longest flying time). The gas exhaust section is terminated by a nozzle 15 of variable section so as to be able to control the expansion ratio of the low-pressure turbine.

In addition, still in this first embodiment of the invention, the propulsion system also comprises an auxiliary propulsion assembly 16 which is separate from the two engines 1 and 1'and which does not have a gas generator. The auxiliary propulsion assembly is constituted in particular by two contrarotating fans 18a and 18b, each advantageously of large diameter. The auxiliary propulsion assembly is used for takeoff, landing, and subsonic cruising flight in a configuration described in greater detail below.

Naturally, the propulsion assembly 16 could comprise a single fan, e.g. a large chord fan controlled by both engines 1 and 1'.

Furthermore, means 20, 20' for transmitting a fraction of the mechanical power produced by the engines 1 and 1' are constituted specifically by a conventional mechanical transmission system having angle takeoffs 22, 22' coupled with annular gears 24 and 24' which are mounted on the low-pressure shafts 14 and 14' of said engines. These annular gears transmit rotary motion from the low-pressure shafts to the propulsion assembly 16 via transmission shafts 26, 26' and angle takeoffs 28, 28' coupled to the rotary shafts 30, 30' of the fans 18a and 18b.

Coupling and decoupling systems 32 and 32' enable a fraction of the mechanical power produced by the engines 1 and 1' to be diverted or not diverted to the propulsion assembly 16 in selective manner. These systems are interposed between the shafts 14, 14' and the shafts 30, 30' respectively, and they are mounted, for example, in the transmission shafts 26 and 26'. These means are controlled synchronously. They are of conventional type for mechanical transmission by means of a shaft and they are therefore not described in detail.

In FIG. 1, it can be seen that the fans 18a and 18b are directly integrated in the rear portion of the airplane fuselage. Closable louvers 34 (side louvers as shown and/or ventral louvers) are also provided in the airplane fuselage to enable the fans 18a and 18b to be fed with air during takeoff, landing, and subsonic cruising flight, and exhaust nozzles 36 are deployed to exhaust the flow of air that produces thrust during these stages of flight. During supersonic cruising flight, the louvers 34 are closed after the fans have been declutched and stopped, and the exhaust nozzles 36 are retracted.

The operation of this first embodiment of the propulsion system of the invention is described below in each of its two possible configurations (one configuration for takeoff, landing, and subsonic cruising flight; and another configuration for supersonic cruising flight).

During takeoff, landing, and subsonic cruising, the coupling and uncoupling systems 32, 32' are in engaged mode and the engines 1 and 1' drive the fans 18a and 18b. Because a fraction of the mechanical power generated by the low-pressure shafts 14 and 14' is taken off to rotate the fans 18a and 18b of the propulsion assembly 16, the exhaust speed from the engines 1 and 1' is reduced very considerably.

The propulsion system thus operates at a high bypass ratio and at low exhaust speed which is well adapted to takeoff, landing, and subsonic cruising flight, making it easier to comply with noise regulations and requirements for low specific fuel consumption. The term "bypass ratio" is used to mean the ratio of the mass of air exhausted by the fans over the mass of gas exhausted by the engines 1, 1'.

The transition between subsonic cruising flight and supersonic cruising flight is then performed by declutching the mechanical transmissions in the shafts 26 and 26'. The airplane is then propelled by the engines 1 and 1' alone, enabling it to reach supersonic flight speeds. The system then operates at a very low (or even zero) bypass ratio with very high exhaust speed (which does indeed correspond to high specific thrust).

Having the fans 18a and 18b housed inside the fuselage means that drag during supersonic flight is reduced.

In a second embodiment of the invention (cf. FIG. 2), the propulsion system comprises two engines 1 and 1' independently controlling two auxiliary propulsion assemblies 16 and 16'.

Figure 2:
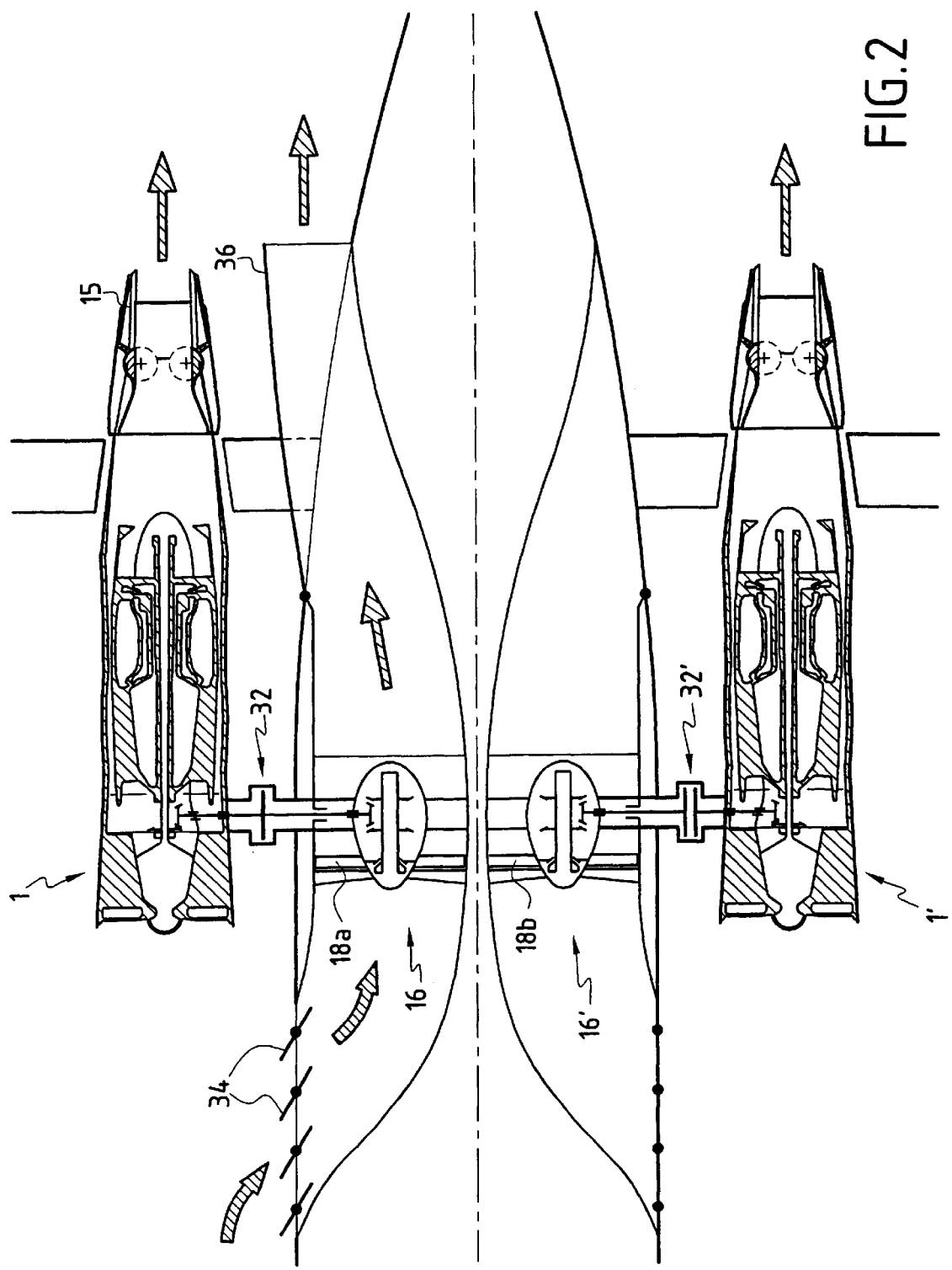
FIG. 2 is a diagrammatic fragmentary view of an airplane having a propulsion system constituting a second embodiment of the invention shown in both of its configurations of use.

As shown in FIG. 2, the fans 18a and 18b are each driven by a respective one of the engines 1 and 1' and they are housed separately in a rear portion of the airplane fuselage. For reasons of optimizing occupancy of the volume within the fuselage, it is possible for the fans to be offset one behind the other along the main axis of the airplane. In addition, closable louvers 34 are provided in the fuselage to enable the propulsion assemblies 16 and 16' to be fed with air, and deployable exhaust nozzles 36 enable that air to be exhausted in order to provide thrust during takeoff, landing, and subsonic cruising flight.

In the event of one of the propulsion assemblies failing, this embodiment makes it possible to continue driving the other auxiliary propulsion assembly.

Naturally, any other embodiment could be devised by combining one or more engines with one or more propulsion assemblies.

The present invention as described above provides numerous advantages, and in particular:

- the propulsion system makes it possible during takeoff and landing to obtain a gas exhaust speed of less than 400 m/s (or indeed close to 300 m/s) corresponding to a noise level of less than 103 dB (90 dB for a speed of less than 300 m/s);
- the separate auxiliary fan enables the mass flow rate of the engine to be increased by 150% to 160%, so that it then operates like a high bypass ratio jet;
- the thrust of the propulsion system can be about 50% to 60% greater than that of the thrust from the engine on its own, without any need to resort to after burning, and the thrust from the fan can be equal to or close to more than half of the total thrust;
- taking off mechanical power makes it possible to reduce exhaust speed by about 25% to 30%, thus avoiding the need to use bulky silencers or exhaust mixers;
- a large drop in specific fuel consumption during subsonic cruising can be obtained because of the high bypass ratio which is equivalent to that of subsonic airplanes;
- the propulsion system uses one or more engines of conventional architecture, thereby limiting the risks of failure that are frequently associated with new technologies; and in the event of a mechanical failure followed by declutching of an auxiliary propulsion assembly, the declutched engine can be changed over to direct jet operation under full power, thereby maintaining sufficient thrust to continue takeoff and then guarantee landing, with the concern then not being to comply with noise standards but to avoid an accident to the airplane.

Naturally, the present invention is not limited to the embodiments described above and it covers any variants thereof.

What is claimed is:

1. A variable cycle of propulsion system for a supersonic airplane, the propulsion system comprising:

at least one low-bypass ratio engine capable of generating thrust for supersonic flight speeds;

at least one high-bypass ratio auxiliary propulsion assembly separate from the at least one low-bypass ratio engine, the at least one high-bypass ratio auxiliary propulsion assembly being capable of generating additional horizontal thrust for takeoff, landing, and subsonic cruising flight at subsonic flight speeds of the airplane, the at least one high-bypass ratio auxiliary propulsion assembly including at least one fan and not having a gas generator;

a mechanical transmission system configured to transmit rotation from a shaft of the at least one low-bypass ratio engine to the at least one fan to enable the at least one high-bypass ratio auxiliary propulsion assembly to generate additional horizontal thrust for the takeoff, the landing, and the subsonic cruising flight at the subsonic flight speeds of the airplane, and to reduce noise during the takeoff, the landing, and the subsonic cruising flight by increasing the bypass ratio of the propulsion system; and decoupling means for decoupling the mechanical transmission system to enable supersonic cruising flight at the supersonic flight speeds of the airplane, the at least one fan of the at least one high-bypass ratio auxiliary propulsion assembly being integrated in the airplane fuselage of the airplane to reduce drag during the supersonic cruising flight at the supersonic flight speeds of the airplane.

2. The system according to claim 1, wherein the airplane fuselage includes closable louvers to enable the at least one fan of the at least one high-bypass ratio auxiliary propulsion assembly to be fed with air during the takeoff, the landing, and the subsonic cruising flight at the subsonic flight speeds of the airplane, and deployable exhaust nozzles to exhaust the flow of air that produces the additional thrust for the takeoff, the landing, and the subsonic cruising flight at the subsonic flight speeds of the airplane.

3. The system according to claim 1, wherein the decoupling means for decoupling the mechanical transmission system includes a clutch system.

4. The system according to claim 1, wherein the at least one high-bypass ratio auxiliary propulsion assembly includes one large chord fan controlled by the at least one low-bypass ratio engine which includes two separate engines.

5. The system according to claim 1, wherein the at least one high-bypass ratio auxiliary propulsion assembly includes at least two contra-rotating fans.

6. The system according to claim 1, wherein the at least one low-bypass ratio engine includes first and second engines and the at least one high-bypass ratio auxiliary propulsion assembly includes first and second auxiliary propulsion assemblies so that the first and second engines are independently associated with the first and second auxiliary propulsion assemblies, respectively.

* * * * *